(12) United States Patent
Nishiyama et al.

(10) Patent No.: US 7,799,480 B2
(45) Date of Patent: Sep. 21, 2010

(54) FUEL CELL STACK WITH DUMMY CELL

(75) Inventors: Tadashi Nishiyama, Sakura (JP); Shigeru Inai, Tochigi-ken (JP); Hideo Kato, Utsunomiya (JP); Jun Kondo, Utsunomiya (JP); Ryo Jinba, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 623 days.

(21) Appl. No.: 11/285,984

(22) Filed: Nov. 23, 2005

(65) Prior Publication Data

US 2006/0110649 A1 May 25, 2006

(30) Foreign Application Priority Data

Nov. 25, 2004 (JP) .............................. 2004-339700

(51) Int. Cl.
H01M 8/02 (2006.01)
H01M 8/24 (2006.01)
H01M 2/14 (2006.01)
H01M 2/00 (2006.01)

(52) U.S. Cl. .................. 429/456; 429/512; 429/469

(58) Field of Classification Search ................. 429/18, 429/26, 30, 32, 35, 37–38, 44; 29/623.1–623.5
See application file for complete search history.

(56) References Cited

U.S. PATENT DOCUMENTS

| 3,321,334 A | 5/1967 | Palmer |
| 4,689,280 A | 8/1987 | Gionfriddo |
| 2002/0058177 A1* | 5/2002 | Nishiyama et al. ............ 429/35 |
| 2002/0102453 A1* | 8/2002 | Suenaga et al. ............... 429/37 |
| 2003/0215693 A1* | 11/2003 | Asai et al. ..................... 429/38 |
| 2003/0219644 A1 | 11/2003 | Inai et al. |
| 2004/0214071 A1* | 10/2004 | Barnett et al. ................. 429/44 |

FOREIGN PATENT DOCUMENTS

| DE | 10322537 A1 | 1/2004 |
| EP | 0233646 | 8/1987 |
| JP | 08-203553 | 8/1996 |
| JP | 10-228918 | 8/1998 |
| JP | 2003-346869 | 12/2003 |

OTHER PUBLICATIONS

German Office action, dated Oct. 9, 2007 (including translation of German Office action).
Japanese Office action from corresponding Japanese Patent Application No. 2004-339700, dated Jun. 23, 2009.

* cited by examiner

*Primary Examiner*—Dah-Wei D Yuan
*Assistant Examiner*—Claire L Rademaker
(74) *Attorney, Agent, or Firm*—Fish & Richardson P.C.

(57) ABSTRACT

A fuel cell stack includes a stack body formed by stacking a plurality of power generation cells in a stacking direction. At one end of the stack body, first and second dummy cells are provided. At the other of the stack body, third and fourth dummy cells are provided. Each of the first to fourth dummy cells includes a first metal separator and a second metal separator. The first metal separator and a first metal separator of the power generation cell have substantially the same shape. The second metal separator and a second metal separator of the power generation cell have substantially the same shape.

7 Claims, 9 Drawing Sheets

FUEL CELL STACK WITH DUMMY CELL

BACKGROUND OF THE INVENTION

1. Field of the Invention

The present invention relates to a fuel cell stack comprising a stack body formed by stacking a plurality of power generation cells in a stacking direction. Each of the power generation cells includes an electrolyte electrode assembly and separators sandwiching the electrolyte electrode assembly. The electrolyte electrode assembly includes a pair of electrodes, and an electrolyte interposed between the electrodes. Each of the separators has a fluid flow field for allowing at least one of a reactant gas and a coolant to flow in a direction along a power generation surface. A fluid passage connected to the fluid flow field extends through the separators in the stacking direction. Terminal plates, insulating plates, and end plates are provided at opposite ends of the stack body.

2. Description of the Related Art

In general, a polymer electrolyte fuel cell employs a membrane electrode assembly (electrolyte electrode assembly) which includes an anode, a cathode, and an electrolyte membrane (electrolyte) interposed between the anode and the cathode. The electrolyte membrane is a solid polymer ion exchange membrane. The membrane electrode assembly and separators sandwiching the membrane electrode assembly make up a unit of a power generation cell for generating electricity. Normally, a predetermined numbers of membrane electrode assemblies and separators are stacked together alternately to form a fuel cell stack.

In the fuel cell, a fuel gas such as a gas chiefly containing hydrogen (hereinafter also referred to as the "hydrogen-containing gas") is supplied to the anode. A gas chiefly containing oxygen or air (hereinafter also referred to as the "oxygen-containing gas") is supplied to the cathode. The catalyst of the anode induces a chemical reaction of the fuel gas to split the hydrogen molecule into hydrogen ions and electrons. The hydrogen ions move toward the cathode through the electrolyte membrane, and the electrons flow through an external circuit to the cathode, creating a DC electrical energy.

In some of power generation cells of the fuel cell stack, in comparison with the other power generation cells, the temperature is decreased easily due to heat radiation to the outside. For example, in the power generation cells provided at ends of the fuel cell stack in the stacking direction (hereinafter also referred to as the "end power generation cells"), since the heat is radiated to the outside from the terminal plates (current collecting plates) for collecting electrical charges generated in each of the power generation cells as electricity, or from the end plates for tightening the stacked power generation cells, the decrease in the temperature is significant.

Therefore, due to the decrease in the temperature, in the end power generation cells, in comparison with power generation cells in the central position of the fuel cell stack, water condensation occurs easily, and the water produced in the power generation cannot be discharged smoothly. Consequently, the power generation performance of the end power generation cells is low.

In an attempt to address the problem, for example, Japanese Laid-Open Patent Publication No. 8-203553 discloses a polymer electrolyte fuel cell as shown in FIG. 9. In the polymer electrolyte fuel cell, each of two tightening plates (end plates) 1 sandwiching a plurality of unit cells (not shown) includes a honeycomb plate 2. Packing plates 3a, 3b are provided on both surfaces of the honeycomb plate 2. Further, end plates 4a, 4b are stacked on the packing plates 3a, 3b. The honeycomb plate 2 includes a frame 2a and a honeycomb body 2b welded to the frame 2a.

The hollow space in the honeycomb body 2b reduces the weight of the tightening plate 1, and improves the mechanical strength of the tightening plate 1 advantageously. Further, gases can flow through the hollow space in the honeycomb body 2b. According to the disclosure of Japanese Laid-Open Patent Publication No. 8-203553, with the use of the honeycomb body 2b, it is possible to achieve low thermal conductivity and thermal insulation by air. Thus, the tightening plate 1 does not radiate heat significantly.

However, in the conventional technique, since the tightening plate 1 is formed by stacking the honeycomb plate 2, the packing plates 3a, 3b, and the end plates 4a, 4b. Therefore, the number of components of the tightening plate 1 is large. The total number of components of the fuel cell stack is increased significantly, and the fuel cell stack cannot be assembled easily. Thus, the fuel cell stack cannot be produced economically.

SUMMARY OF THE INVENTION

A main object of the present invention is to provide a fuel cell stack having simple and economical structure in which it is possible to maintain the desired power generation performance.

The present invention relates to a fuel cell stack comprising a stack body formed by stacking a plurality of power generation cells in a stacking direction. Each of the power generation cells includes an electrolyte electrode assembly and separators sandwiching the electrolyte electrode assembly. The electrolyte electrode assembly includes a pair of electrodes, and an electrolyte interposed between the electrodes. Each of the separators has a fluid flow field for allowing at least one of a reactant gas and a coolant to flow in a direction along a power generation surface. A fluid passage connected to the fluid flow field extends through the separators in the stacking direction. Terminal plates, insulating plates, and end plates are provided at opposite ends of the stack body.

The fuel cell stack includes a dummy cell provided at least at one end of the stack body in the stacking direction. The dummy cell corresponds to the power generation cell. The dummy cell includes a dummy electrode assembly and dummy separators sandwiching the dummy electrode assembly. The dummy electrode assembly includes an electrically conductive plate corresponding to the electrolyte. The dummy separators and the separators have substantially the same structure.

Preferably, the dummy separator selectively blocks the fluid flow between the fluid flow field and the fluid passage. Therefore, the same separator can be used economically for controlling the supply of the reactant gas and the coolant easily.

Further, preferably, a heat insulating space is formed in the dummy cell or between the dummy cells. Therefore, the dummy cells function as heat insulating layers. It is possible to effectively prevent the delay in raising the temperature of the end power generation cell, and prevent the voltage drop in the end power generation cell at the time of starting operation of the fuel cell stack at a low temperature.

Further, preferably, the separator and the dummy separator comprise first and second metal separators. In this structure, a first insulating member is formed on both surfaces of the first metal separator. The first insulating member includes a ridge seal. A second insulating member is formed on both surfaces of the second metal separator. The second insulating member only includes a planar seal. An end separator is provided between the dummy cell and the terminal plate or the insulating plate. The end separator and the second metal separator have the same structure. The end separator includes a ridge seal at a position overlapping the ridge seal of the first metal separator of the dummy cell in the stacking direction. The ridge seal of the end separator protrudes toward the terminal plate or the insulating plate.

According to the present invention, no electrolyte is used in the dummy cell. Therefore, no water is produced in the power generation. The dummy cell functions as the heat insulating layer. Accordingly, it is possible to effectively prevent the delay in raising the temperature of the end power generation cell, and prevent the voltage drop in the end power generation cell at the time of starting operation of the fuel cell stack at a low temperature.

Further, the dummy separator having substantially the same structure as the structure of the separator of the power generation cell is used in the dummy cell. Therefore, common components can be used in both of the power generation cell and the dummy cell. In comparison with the case in which dedicated heat insulating plates or the like are used, the fuel cell stack can be produced economically as a whole.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
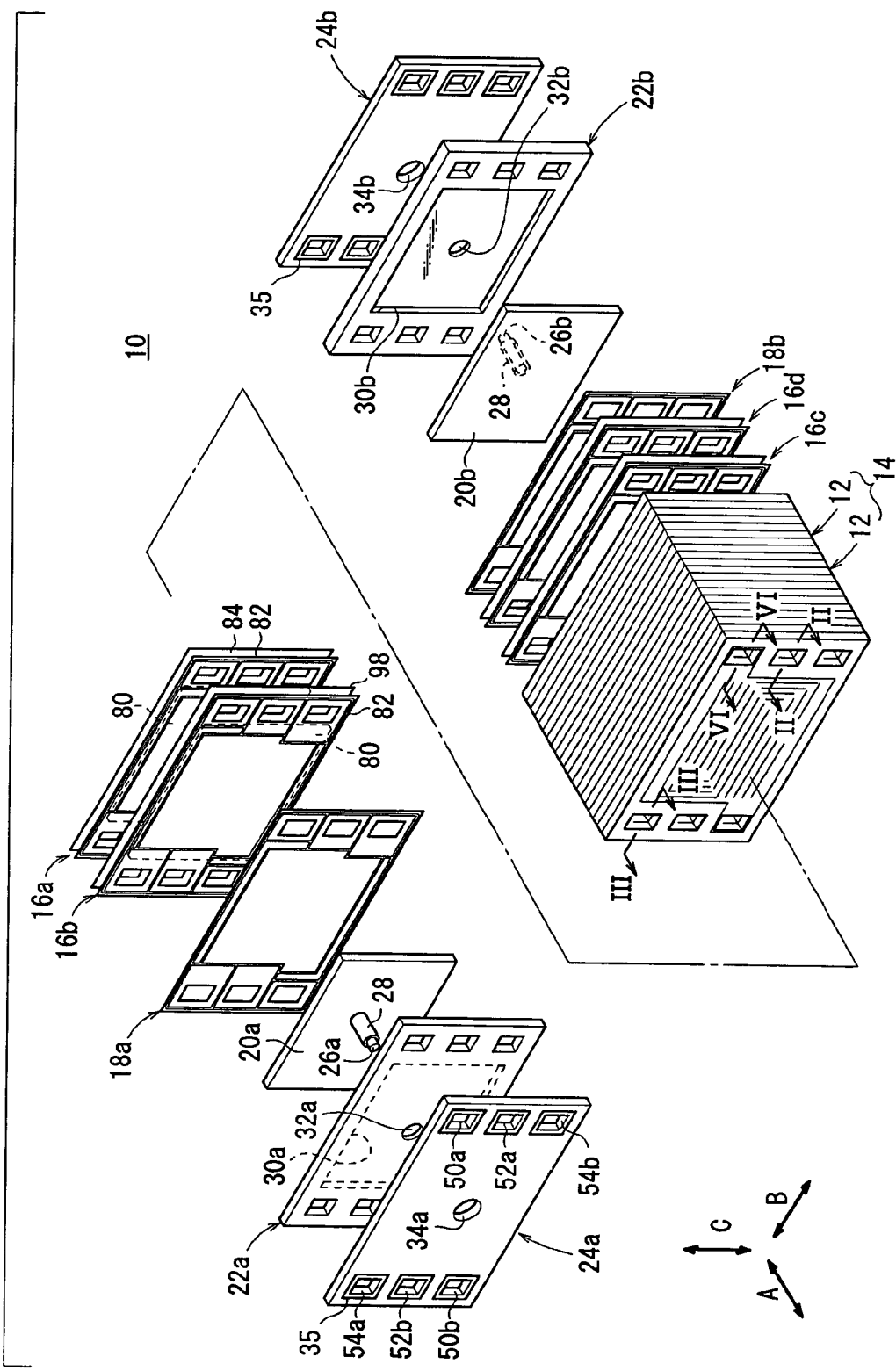
FIG. 1 is a partial exploded perspective view showing a fuel cell stack according to an embodiment of the present invention.
Figure 2:
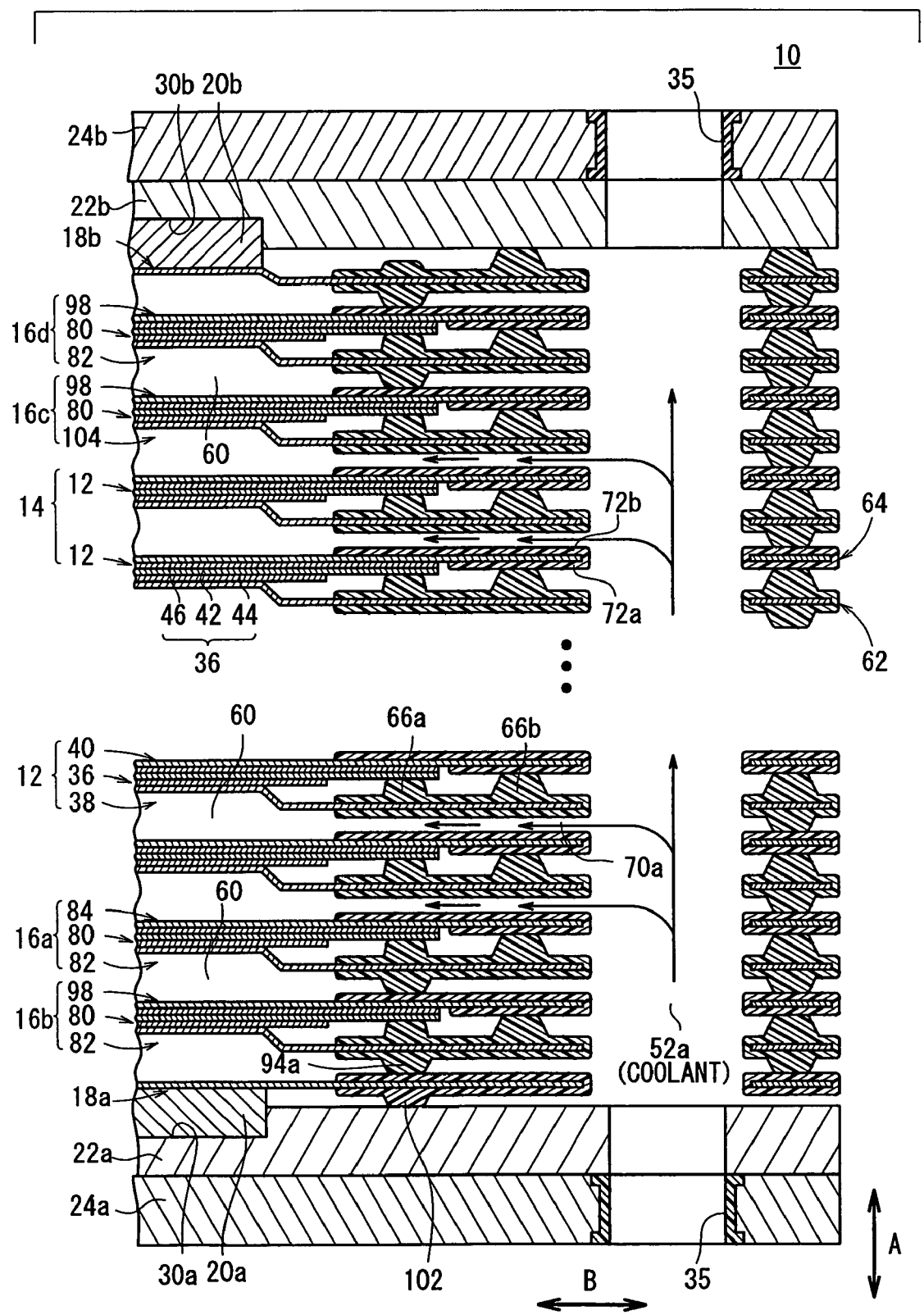
FIG. 2 is a cross sectional view showing the fuel cell stack, taken along a line II-II in FIG. 1.
Figure 3:
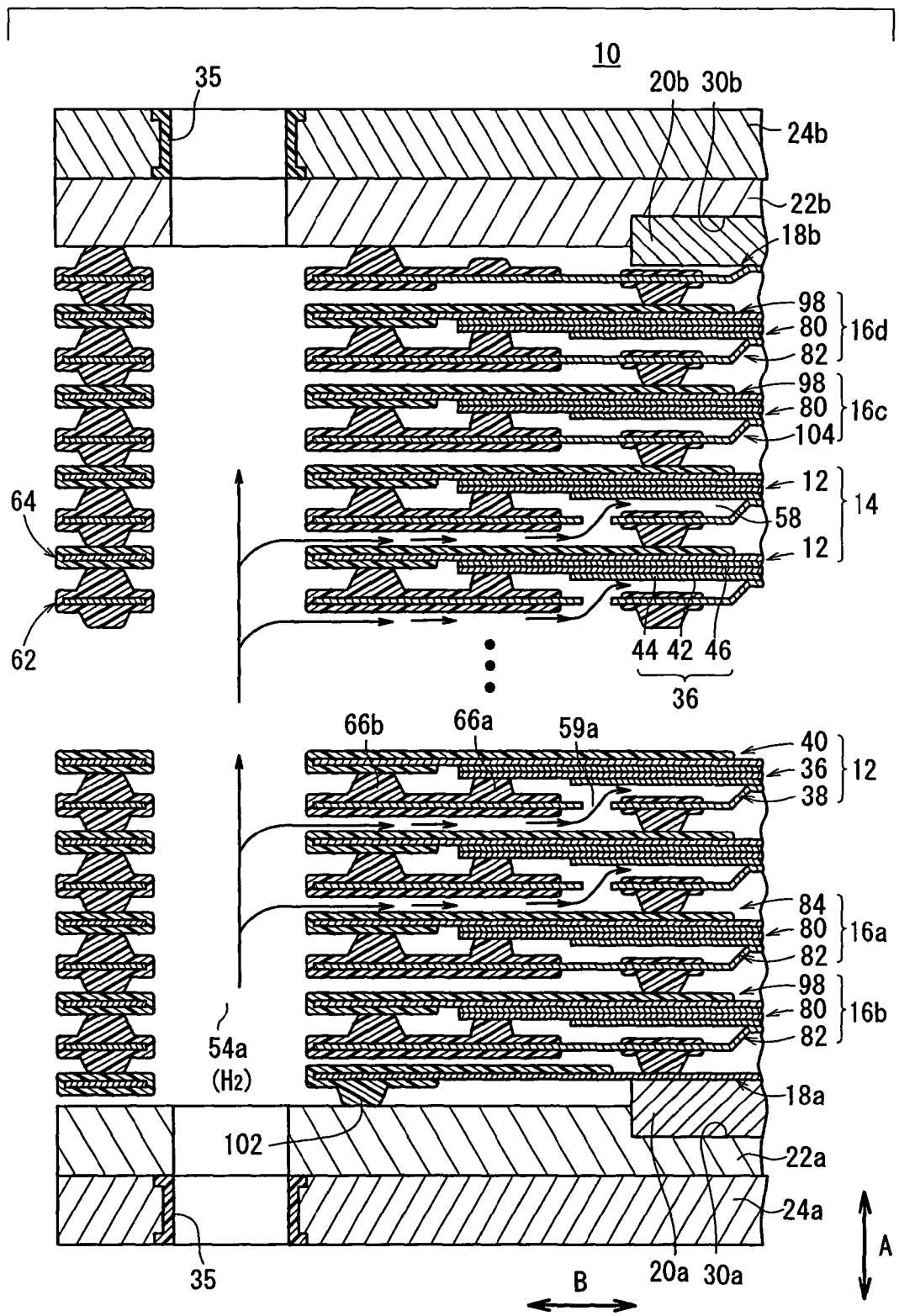
FIG. 3 is a cross sectional view showing the fuel cell stack, taken along a line III-III in FIG. 1.
Figure 4:
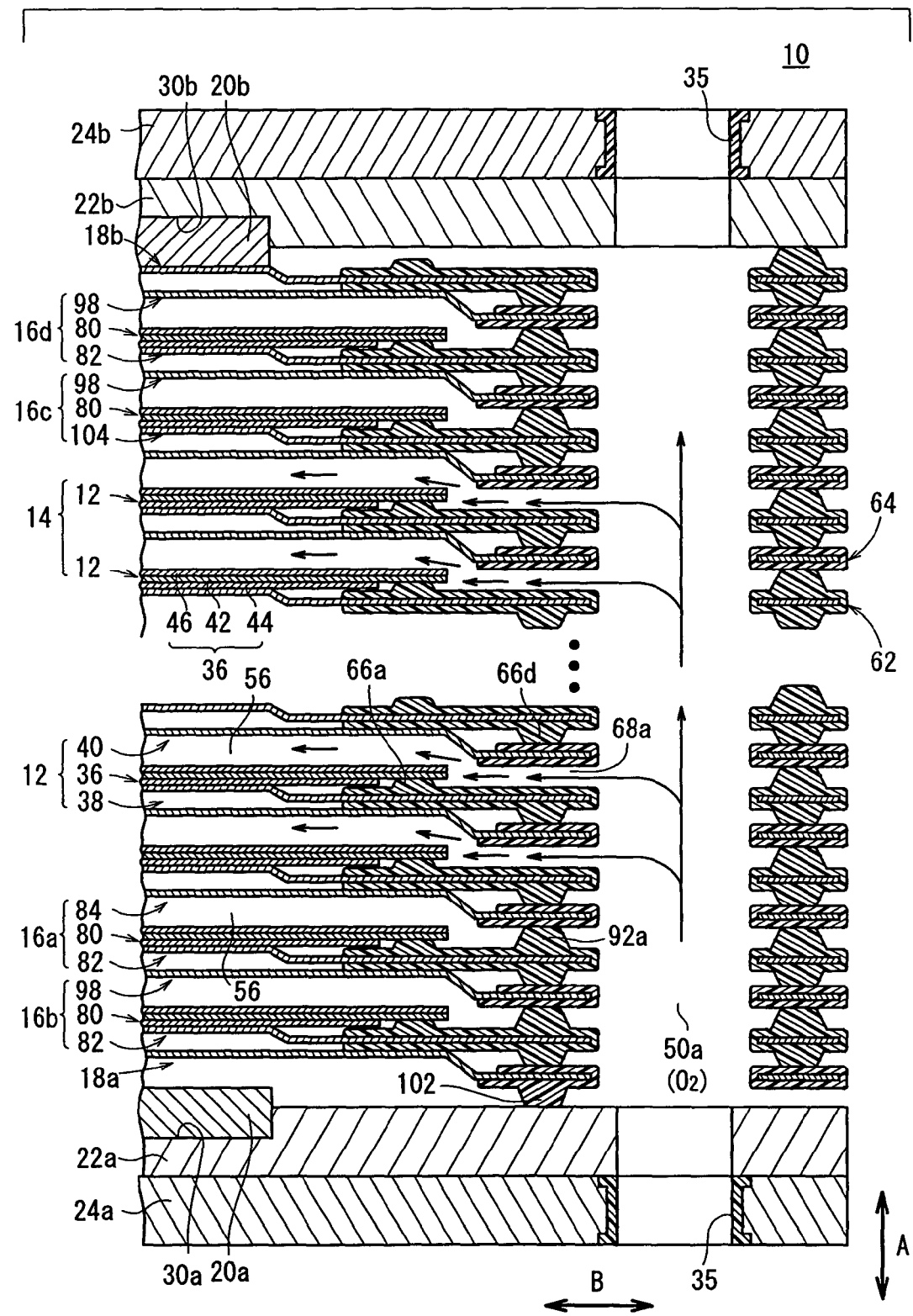
FIG. 4 is a cross sectional view showing the fuel cell stack, taken along a line IV-IV in FIG. 1.

FIG. 1 is a partial exploded perspective view showing a fuel cell stack 10 according to an embodiment of the present invention. FIG. 2 is a cross sectional view showing the fuel cell stack 10, taken along a line II-II in FIG. 1. FIG. 3 is a cross sectional view showing the fuel cell stack 10, taken along a line III-III in FIG. 1. FIG. 4 is a cross sectional view showing the fuel cell stack 10, taken along a line IV-IV in FIG. 1.

The fuel cell stack 10 includes a stack body 14 formed by stacking a plurality of power generation cells 12 in a stacking direction indicated by the arrow A. At one end of the stack body 14 in the stacking direction indicated by the arrow A, a first dummy cell 16a is provided. A second dummy cell 16b is provided outside the first dummy cell 16a. Further, an end separator 18a is provided outside the second dummy cell 16b.

At the other end of the stack body 14 in the stacking direction, a third dummy cell 16c is provided. A fourth dummy cell 16d is provided outside the third dummy cell 16c. Further, an end separator 18b is provided outside the fourth dummy cell 16d.

A terminal plate 20a is provided outside the end separator 18a. An insulating plate 22a is provided outside the terminal plate 20a. An end plate 24a is provided outside the insulating plate 22a. A terminal plate 20b is provided outside the end separator 18b. An insulating plate 22b is provided outside the terminal plate 20b. An end plate 24b is provided outside the insulating plate 22b.

For example, the fuel cell stack 10 is placed in a box-shaped casing (not shown) including the rectangular end plates 24a, 24b. Alternatively, components of the fuel cell stack 10 may be tightened together by a plurality of tie rods (not shown) extending in the direction indicated by the arrow A.

A terminal 26a is provided at substantially the center of the terminal plate 20a, and a terminal 26b is provided at substantially the center of the terminal plate 20b. The terminals 26a, 26b are inserted into insulating cylinders 28 and extend outwardly from the end plates 24a, 24b, respectively. For example, the insulating plates 22a, 22b are made of insulating material such as polycarbonate (PC) or phenol resin.

A rectangular recess 30a is formed at the center of the insulating plate 22a, and a rectangular recess 30b is formed at the center of the insulating plate 22b. A hole 32a is formed at substantially the center of the recess 30a, and a hole 32b is formed at substantially the center of the recess 30b. The terminal plates 20a, 20b are placed in the recesses 30a, 30b, respectively. The terminals 26a, 26b of the terminal plates 20a, 20b are inserted into the holes 32a, 32b through the insulating cylinders 28, respectively.

A hole 34a is formed at substantially the center of the end plate 24a, and a hole 34b is formed at substantially the center of the end plate 24b. The holes 34a, 34b are coaxial with the holes 32a, 32b, respectively. Insulating grommets 35 are attached to the end plates 24a, 24b, around the inner surfaces of an oxygen-containing gas supply passage 50a, a coolant supply passage 52a, a fuel gas discharge passage 54b, a fuel gas supply passage 54a, a coolant discharge passage 52b, and an oxygen-containing gas discharge passage 50b as described later.

Figure 5:
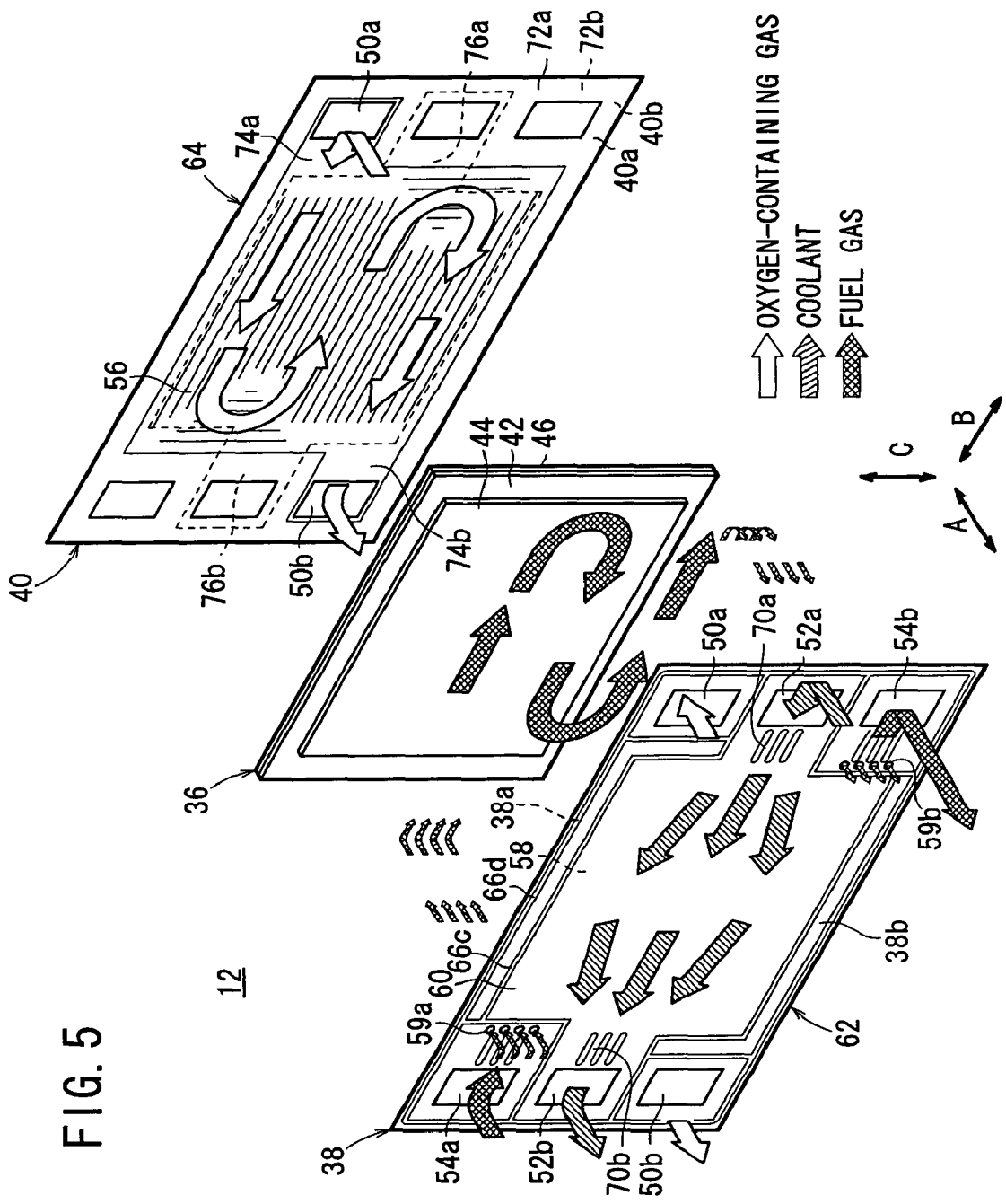
FIG. 5 is an exploded perspective view showing a power generation cell of the fuel cell stack.

As shown in FIG. 5, the power generation cell 12 includes a membrane electrode assembly 36 and first and second metal separators 38, 40 sandwiching the membrane electrode assembly 36. For example, the first and second metal separators 38, 40 are steel plates, stainless steel plates, aluminum plates, plated steel sheets, or metal plates having anti-corrosive surfaces by surface treatment. Alternatively, carbon member or the like may be used as the first and second separators.

The membrane electrode assembly 36 includes an anode 44, a cathode 46, and a solid polymer electrolyte membrane 42 interposed between the anode 44 and the cathode 46. The solid polymer electrolyte membrane 42 is formed by impregnating a thin membrane of perfluorosulfonic acid with water, for example. The surface area of the anode 44 is smaller than the surface area of the cathode 46.

Each of the anode 44 and the cathode 46 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the anode 44 and the electrode catalyst layer of the cathode 46 are fixed to both surfaces of the solid polymer electrolyte membrane 42, respectively.

At one end of the power generation cell 12 in a horizontal direction indicated by an arrow B, the oxygen-containing gas supply passage 50a for supplying an oxygen-containing gas such as air, the coolant supply passage 52a for supplying a coolant, and the fuel gas discharge passage 54b for discharging a fuel gas such as a hydrogen-containing gas are arranged vertically in a direction indicated by an arrow C. The oxygen-containing gas supply passage 50a, the coolant supply passage 52a, and the fuel gas discharge passage 54b extend through the power generation cell 12 in the direction indicated by the arrow A.

At the other end of the fuel cell stack 10 in the direction indicated by the arrow B, the fuel gas supply passage 54a for supplying the fuel gas, the coolant discharge passage 52b for discharging the coolant, and the oxygen-containing gas discharge passage 50b for discharging the oxygen-containing gas are arranged vertically in the direction indicated by the arrow C. The fuel gas supply passage 54a, the coolant discharge passage 52b, and the oxygen-containing gas discharge passage 50b extend through the power generation cell 12 in the direction indicated by the arrow A.

The second metal separator 40 has an oxygen-containing gas flow field 56 on its surface 40a facing the membrane electrode assembly 36. The oxygen-containing gas flow field 56 comprises a plurality of grooves in a serpentine pattern for allowing the oxygen-containing gas to flow back and forth in the direction indicated by the arrow B, and move downwardly. The oxygen-containing gas flow field 56 is connected to the oxygen-containing gas supply passage 50a and the oxygen-containing gas discharge passage 50b.

Figure 6:
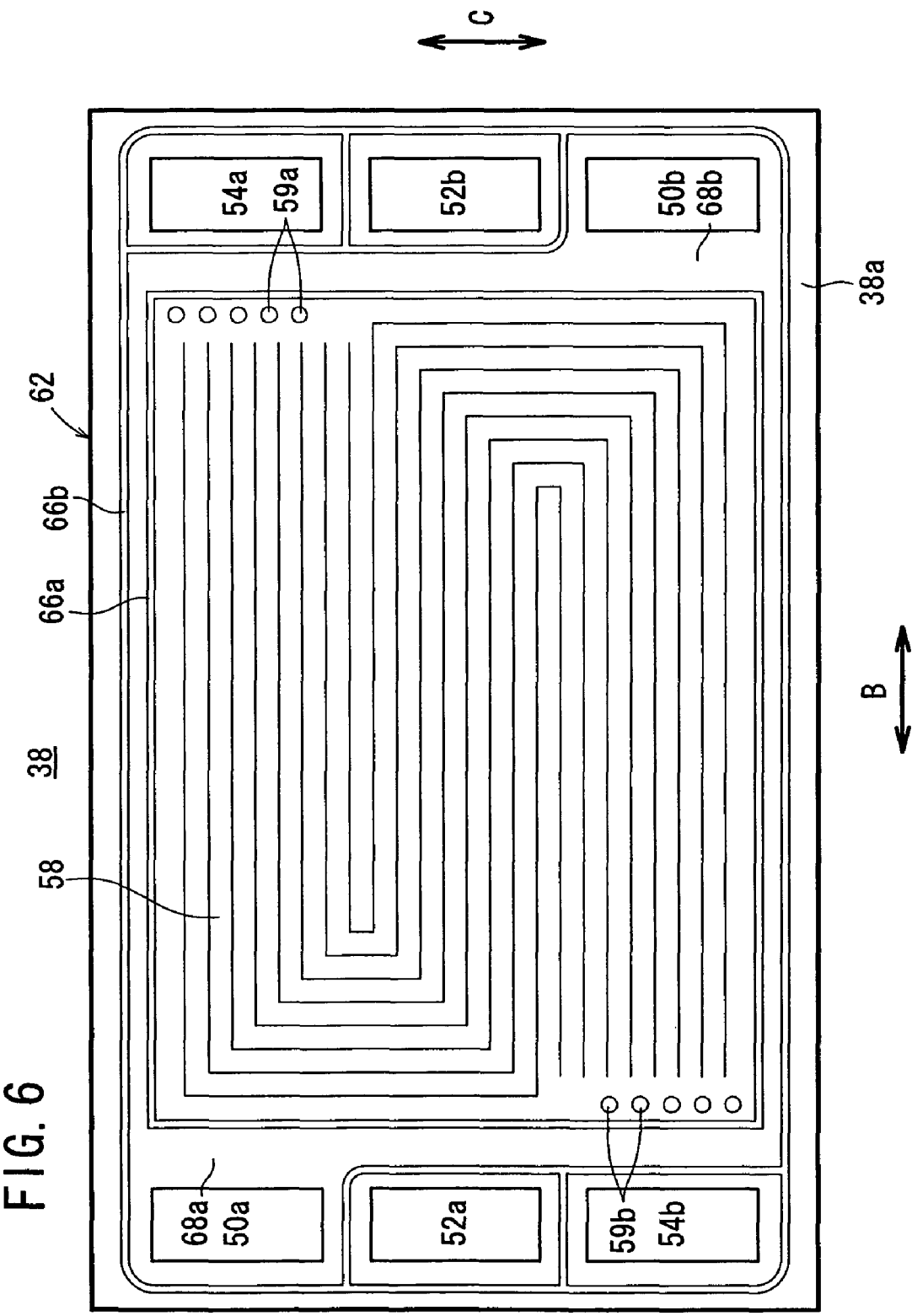
FIG. 6 is a front view showing a first metal separator of the power generation cell.

As shown in FIG. 6, the first metal separator 38 has a fuel gas flow field 58 on its surface 38a facing the membrane electrode assembly 36. The fuel gas flow field 58 comprises a plurality of grooves in a serpentine pattern for allowing the fuel gas to flow back and forth in the direction indicated by the arrow B, and move downwardly in the direction indicated by the arrow C. The first metal separator 38 has a plurality of supply holes 59a connecting the fuel gas supply passage 54a and the fuel gas flow field 58, and a plurality of discharge holes 59b connecting the fuel gas flow field 58 and the fuel gas discharge passage 54b.

As shown in FIG. 5, a coolant flow field 60 is formed between a surface 38b of the first metal separator 38 and a surface 40b of the second metal separator 40. The coolant flow field 60 is connected to the coolant supply passage 52a and the coolant discharge passage 52b. For example, the coolant flow field 60 includes a plurality of grooves extending straight in the direction indicated by the arrow B.

As shown in FIGS. 2 to 5, a first insulating member 62 is formed integrally on the surfaces 38a, 38b of the first metal separator 38 around the outer end of the first metal separator 38, and a second insulating member 64 is formed integrally on the surfaces 40a, 40b of the second metal separator 40 around the outer end of the second metal separator 40.

The first and second insulating members 62, 64 are made of seal material, cushion material or packing material such as EPDM (Ethylene Propylene Diene Monomer), NBR (Nitrile Butadiene Rubber), fluoro rubber, silicone rubber, fluoro silicone rubber, butyl rubber (Isobutene-Isoprene Rubber), natural rubber, styrene rubber, chloroprene rubber, or acrylic rubber.

As shown in FIG. 6, the first insulating member 62 includes an inner seal (ridge seal) 66a and an outer seal (ridge seal) 66b formed integrally on the surface 38a of the first metal separator 38. The inner seal 66a is formed around the fuel gas flow field 58, the supply holes 59a, and the discharge holes 59b. The outer seal 66b is formed around the outer end of the surface 38a. The outer seal 66b forms a channel 68a connected to the oxygen-containing gas supply passage 50a, and a channel 68b connected to the oxygen-containing gas discharge passage 50b.

As shown in FIG. 5, the first insulating member 62 includes an inner seal (ridge seal) 66c and an outer seal (ridge seal) 66d formed integrally on the surface 38b of the first metal separator 38. The inner seal 66c is formed around the coolant flow field 60, the coolant supply passage 52a, and the coolant discharge passage 52b. The coolant flow field 60 is connected to the coolant supply passage 52a through a channel 70a, and connected to the coolant discharge passage 52b through a channel 70b.

The second insulating member 64 includes a planar seal 72a formed integrally on the surface 40a of the second metal separator 40, and a planar seal 72b formed integrally on the surface 40b of the second metal separator 40. The planar seal 72a includes a step region 74a connecting the oxygen-containing gas supply passage 50a to the oxygen-containing gas flow field 56, and a step region 74b connecting the oxygen-containing gas discharge passage 50b to the oxygen-containing gas flow field 56. The planar seal 72b includes a step region 76a connecting the coolant supply passage 52a to the coolant flow field 60, and a step region 76b connecting the coolant discharge passage 52b to the coolant flow field 60.

Figure 7:
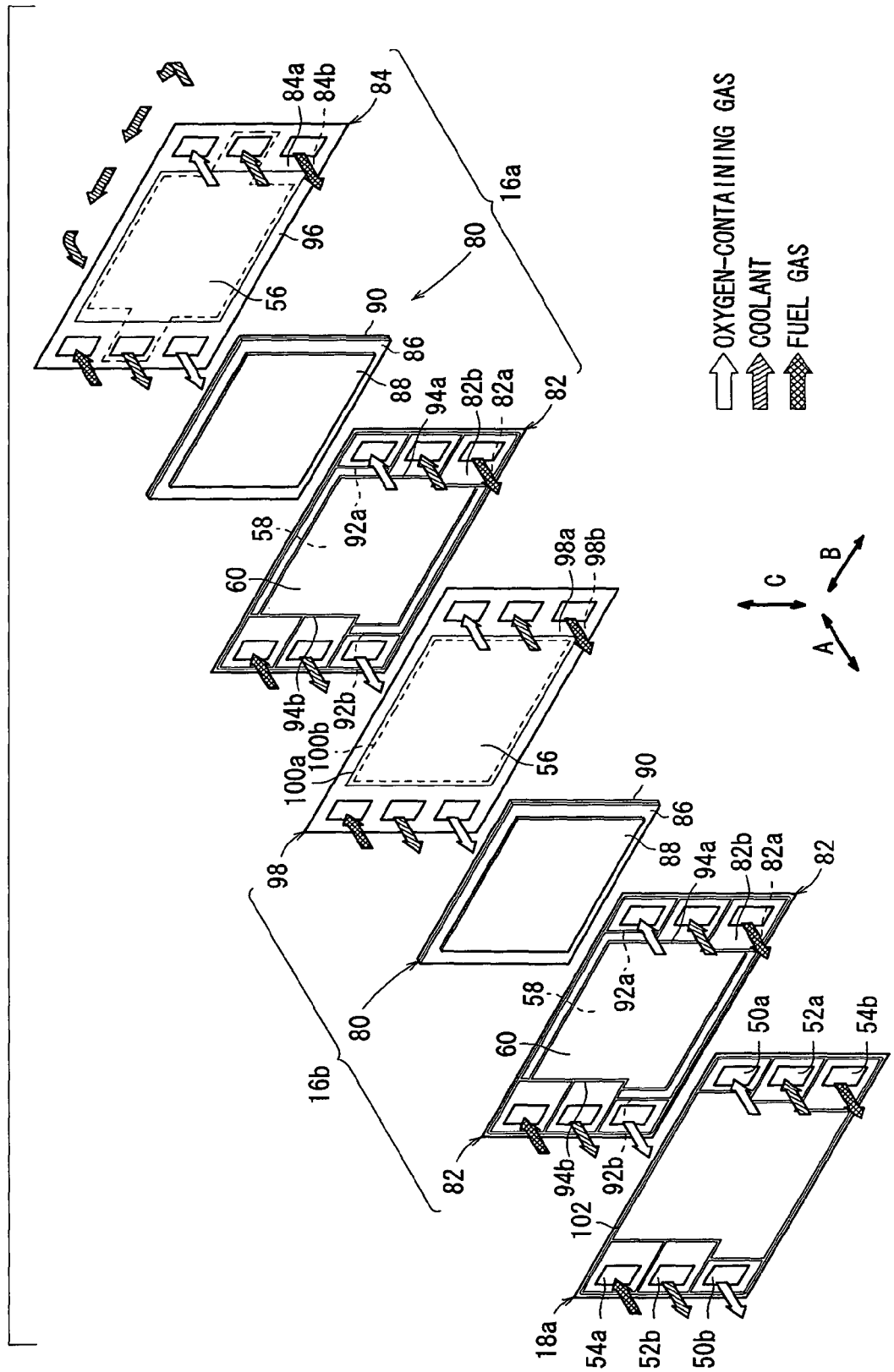
FIG. 7 is an exploded perspective view showing first and second dummy cells of the fuel cell stack.

As shown in FIG. 7, the first dummy cell 16a includes a dummy electrode assembly 80, and first and second metal separators (dummy separators) 82, 84 sandwiching the dummy electrode assembly 80. The dummy electrode assembly 80 includes an anode carbon paper 88, a cathode carbon paper 90, and a metal plate 86 interposed between the anode carbon paper 88 and the cathode carbon paper 90. The metal plate 86 corresponds to the solid polymer electrolyte membrane 42. The anode carbon paper 88 corresponds to the gas diffusion layer of the anode 44, and the cathode carbon paper 90 corresponds to the gas diffusion layer of the cathode 46.

The structure of the first metal separator 82 is substantially the same as the structure of the first metal separator 38, and the structure of the second metal separator 84 is substantially the same as the structure of the second metal separator 40. The constituent elements of the first metal separator 82 and the second metal separator 84 that are identical to those of the first metal separator 38 and the second metal separator 40 are labeled with the same reference numeral, and detailed description thereof will be omitted. Also in the second to fourth dummy cells 16b to 16d as described later, detailed description of first and second metal separators will be omitted.

The first metal separator 82 includes seals 92a, 92b on a surface 82a facing the dummy electrode assembly 80. The seals 92a, 92b block the flow of the oxygen-containing gas between the oxygen-containing gas supply passage 50a and the oxygen-containing gas discharge passage 50b, and the oxygen-containing gas flow field 56. The channels 68a, 68b are not provided on the surface 82a of the first metal separator 82. The first metal separator 82 includes seals 94a, 94b on a surface 82b opposite to the dummy electrode assembly 80. The seals 94a, 94b block the flow of the coolant between the coolant supply passage 52a and the coolant discharge passage 52b, and the coolant flow field 60. The channels 70a, 70b are not provided on the surface 82b of the first metal separator 82. The supply holes 59a and discharge holes 59b are also not provided in the first metal separator 82.

The second metal separator 84 has a planar seal 96 formed integrally on a surface 84a facing the dummy electrode assembly 80. The planar seal 96 does not include the step regions 74a, 74b. Therefore, the flow of the oxygen-containing gas between the oxygen-containing gas supply passage 50a and the oxygen-containing gas discharge passage 50b, and the oxygen-containing gas flow field 56 is blocked.

The second dummy cell 16b includes a dummy electrode assembly 80 and first and second metal separators (dummy separators) 82, 98 sandwiching the dummy electrode assembly 80. The second metal separator 98 has a planar seal 100a on a surface 98a facing the dummy electrode assembly 80, and a planar seal 100b on the other surface 98b. The planar seal 100a closes the oxygen-containing gas flow field 56, and the planar seal 100b closes the coolant flow field 60.

The structure of the end separator 18a is substantially the same as the structure of the second metal separator 98. The end separator 18a has a seal 102 on a surface facing the insulating plate 22a. The seal 102 corresponds to the outer seal 66d provided on the first metal separator 82.

Figure 8:
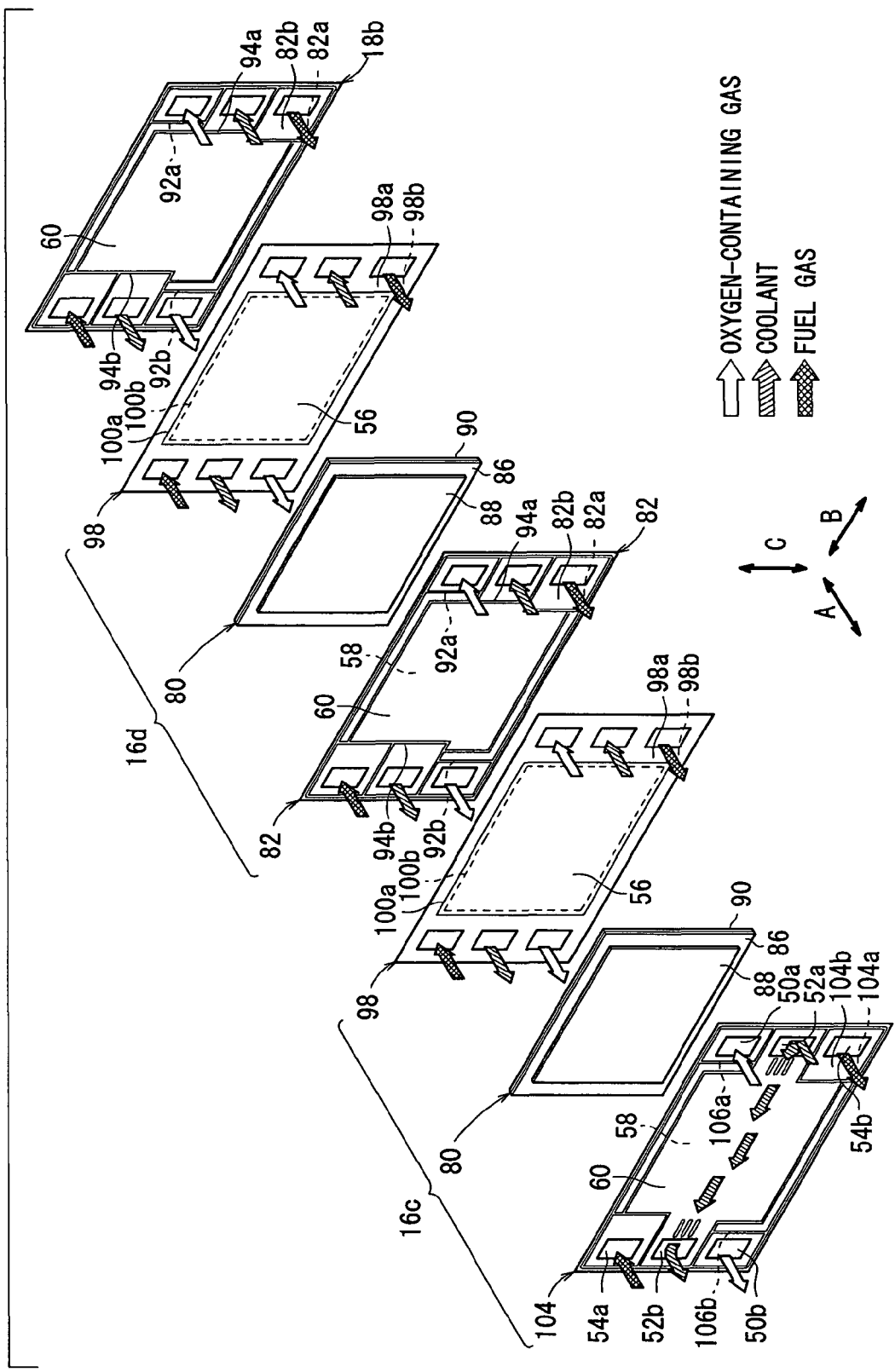
FIG. 8 is an exploded perspective view showing third and fourth dummy cells of the fuel cell stack.
Figure 9:
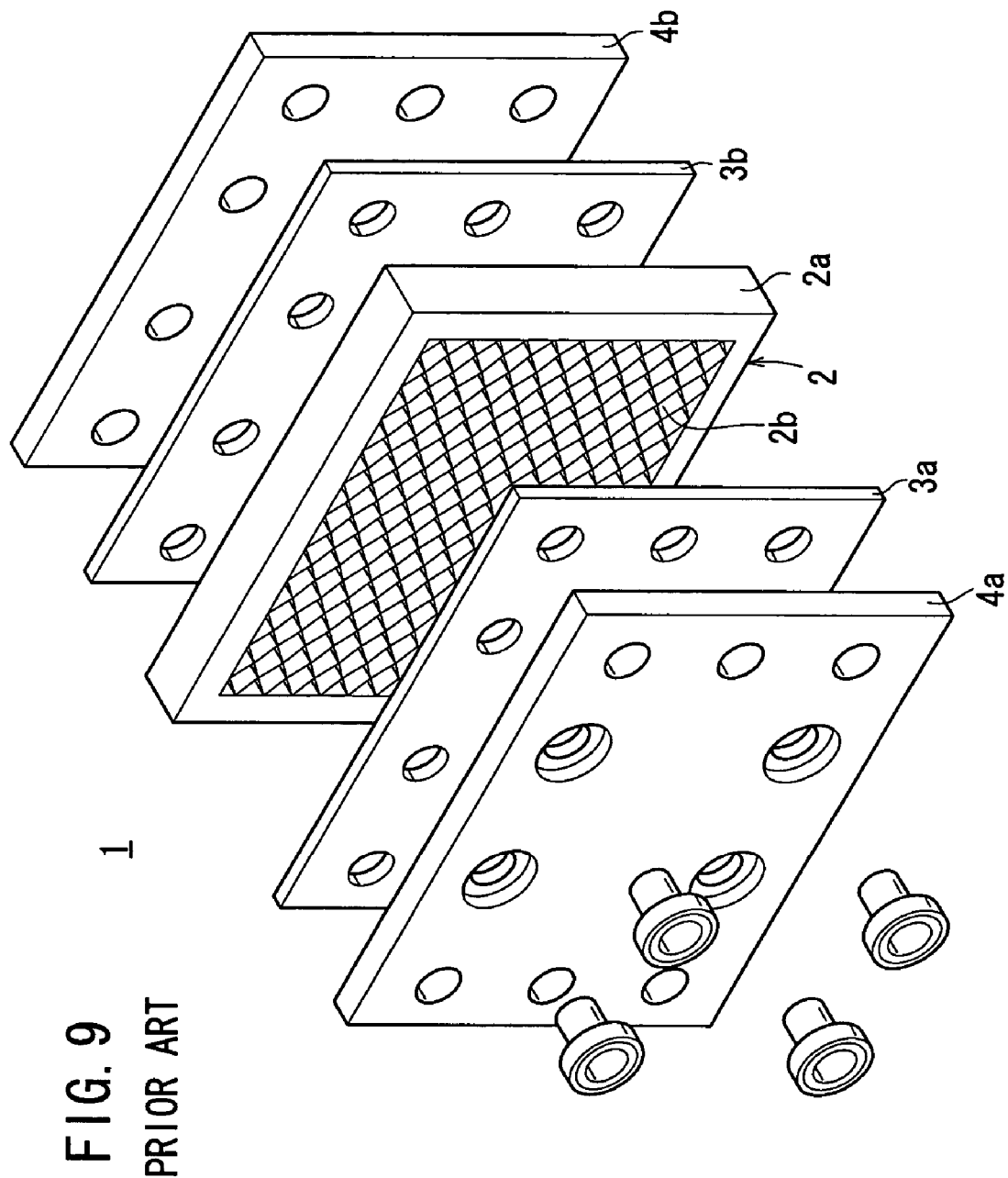
FIG. 9 is a perspective view showing main components of a conventional polymer electrolyte fuel cell.

As shown in FIG. 8, the third dummy cell 16c includes a dummy electrode assembly 80 and first and second metal separators 104, 98 sandwiching the dummy electrode assembly 80. The first metal separator 104 has seals 106a, 106b on its surface 104a facing the dummy electrode assembly 80. The seals 106a, 106b block the flow of the oxygen-containing gas between the oxygen-containing gas supply passage 50a and the oxygen-containing gas discharge passage 50b, and the oxygen-containing gas flow field 56. On the surface 104b of the first metal separator 104, the coolant flow field 60 is connected to the coolant supply passage 52a and the coolant discharge passage 52b.

The fourth dummy cell 16d includes a dummy electrode assembly 80, and first and second metal separators 82, 98 sandwiching the dummy electrode assembly 80. The structure of the end separator 18b is the same as the structure of the first metal separator 82.

Operation of the fuel cell stack 10 will be described below.

Firstly, in FIG. 1, an oxygen-containing gas is supplied to the oxygen-containing gas supply passage 50a, and a fuel gas such as a hydrogen-containing gas is supplied to the fuel gas supply passage 54a. Further, a coolant such as pure water, ethylene glycol, or oil is supplied to the coolant supply passage 52a.

As shown in FIGS. 4 and 5, the oxygen-containing gas flows from the oxygen-containing gas supply passage 50a into the oxygen-containing gas flow field 56 of the second metal separator 40. In the oxygen-containing gas flow field 56, the oxygen-containing gas flows back and forth in the direction indicated by the arrow B, and moves downwardly, along the cathode 46 of the membrane electrode assembly 36 for inducing an electrochemical reaction at the cathode 46.

As shown in FIGS. 3 and 5, the fuel gas flows from the fuel gas supply passage 54a into the fuel gas flow field 58 of the first metal separator 38 through the supply holes 59a. In the fuel gas flow field 58, the fuel gas flows back and forth in the direction indicated by the arrow B, and moves downwardly, along the anode 44 of the membrane electrode assembly 36 for inducing an electrochemical reaction at the anode 44.

Thus, in each of the membrane electrode assemblies 36, the oxygen-containing gas supplied to the cathode 46, and the fuel gas supplied to the anode 44 are consumed in the electrochemical reactions at catalyst layers of the cathode 46 and the anode 44 for generating electricity.

Then, the oxygen-containing gas consumed at the cathode 46 is discharged into the oxygen-containing gas discharge passage 50b, and flows in the direction indicated by the arrow A. Likewise, the fuel gas consumed at the anode 44 is discharged into the fuel gas discharge passage 54b through the discharge holes 59b, and flows in the direction indicated by the arrow A.

Further, as shown in FIGS. 2 and 5, the coolant supplied to the coolant flow passage 52a flows into the coolant flow field 60 between the first metal separator 38 and the second metal separator 40, and flows in the direction indicated by the arrow B. After the coolant cools the membrane electrode assembly 36, the coolant is discharged from the coolant discharge passage 52b.

In the embodiment of the present invention, the first and second dummy cells 16a, 16b, and the third and fourth dummy cells 16c, 16d are provided at opposite ends of the stack body 14 in the stacking direction. Each of the dummy electrode assemblies 80 of the first to fourth dummy cells 16a to 16d includes the electrically conductive metal plate 86 instead of the solid polymer electrolyte membrane 42.

Therefore, at the time of starting operation of the fuel cell stack 10, no water is produced by power generation in the first to fourth dummy cells 16a to 16d. The first to fourth dummy cells 16a to 16d function as heat insulating layers. Therefore, it is possible to effectively prevent the delay in raising the temperature of the power generation cells 12 provided at ends of the stack body 14, and prevent the decrease in the voltage of the power generation cells 12.

Further, the first and second metal separators 38, 40 of the power generation cell 12 are used as the first and second metal separators 82, 84 of the first dummy cell 16a. That is, with only a minor change in the model design or the like, the common separator can be used for both types of the power generation cells 12 and the dummy cells 16a to 16d. Specifically, as shown in FIG. 7, the first metal separator 82 has the seals 92a, 92b on the surface 82a for preventing the flow of the oxygen-containing gas, and the seals 94a, 94b on the surface 82b for preventing the flow of the coolant. The supply holes 59a or discharge holes 59b are not formed to prevent the fuel gas from passing through the first metal separator 82.

In the second metal separator 84, the coolant flows on the surface 84b, and the flow of the oxygen-containing gas on the surface 84a is prevented by the planar seal 96 which closes the step regions 74a, 74b.

Further, in the second metal separator 98 of the second dummy cell 16b, the planar seal 100b is provided on the surface 98b. The planar seal 100b closes the step regions 76a, 76b. Thus, the flow of the coolant between the first metal separator 82 and the second metal separator 98 is prevented. Further, the planar seal 100a is provided on the surface 98a of the second metal separator 98. The planar seal 100a closes the step regions 74a, 74b for preventing the flow of the oxygen-containing gas.

Thus, when the first and second dummy cells 16a, 16b are stacked, the oxygen-containing gas, the fuel gas, and the coolant do not flow through the oxygen-containing gas flow field 56, the fuel gas flow field 58, and the coolant flow field 60 in each of the first and second dummy cells 16a, 16b. The oxygen-containing gas flow field 56, the fuel gas flow field 58, and the coolant flow field 60 form heat insulating spaces.

As shown in FIG. 8, in the first metal separator 104 of the third dummy cell 16c, the seals 106a, 106b are provided on the surface 104a for preventing the oxygen-containing gas from being supplied to the oxygen-containing gas flow field 56. The coolant can flows along the coolant flow field 60 on the surface 104b of the first metal separator 104.

Further, in the fourth dummy cell 16d, as in the case of the second dummy cell 16b, the flows of the fuel gas, the oxygen-containing gas, and the coolant along the power generation surfaces are limited.

No dedicated heat insulating plates or the like need to be used for the first to fourth dummy cells 16a to 16d. The number of components can be reduced as much as possible economically.

Further, the end separator 18a is provided outside the second dummy cell 16b. The end separator 18a has the ridge seal 102 which contacts the insulating plate 22a.

The end separator 18b is provided outside the fourth dummy cell 16d. The structure of the end separator 18b is the same as the structure of the first metal separator 82. The outer ridge seal 66b of the end separator 18b contacts the insulating plate 22b. Thus, the seal line between the insulating plates 22a, 22b is maintained reliably.

While the invention has been particularly shown and described with reference to a preferred embodiment, it will be understood that variations and modifications can be effected thereto by those skilled in the art without departing from the spirit and scope of the invention as defined by the appended claims.

What is claimed is:

1. A fuel cell stack comprising a stack body formed by stacking a plurality of power generation cells in a stacking direction, said power generation cells each including an electrolyte electrode assembly and separators sandwiching said electrolyte electrode assembly, said electrolyte electrode assembly including a pair of electrodes, and an electrolyte interposed between said electrodes, said separators each having a fluid flow field for allowing at least one of a reactant gas and a coolant to flow in a direction along a power generation surface, a fluid passage connected to said fluid flow field extending through said separators in the stacking direction, said fuel cell stack further comprising:

terminal plates, insulating plates, and end plates provided at opposite ends of said stack body; and a dummy cell provided at least at one end of said stack body in the stacking direction, said dummy cell corresponding to said power generation cell, wherein said dummy cell comprises:

a dummy electrode assembly having a same shape as one of said electrolyte electrode assemblies of said power generation cells, said dummy electrode assembly including a metal plate with a same shape as one of said electrolytes, and carbon papers sandwiching said metal plate, each carbon paper having a same shape as one of said electrodes; and dummy separators sandwiching said dummy electrode assembly, said dummy separators and said separators having substantially the same structure, wherein a heat insulating space is formed at least in said dummy cell or between a plurality of such dummy cells.

2. A fuel cell stack according to claim 1, wherein said dummy separator selectively blocks the fluid flow between said fluid flow field and said fluid passage.

3. A fuel cell stack according to claim 2, wherein said dummy separator has a seal for selectively blocking the fluid flow between said fluid flow field and said fluid passage.

4. A fuel cell stack according to claim 1, wherein said heat insulating space is formed by a seal of said dummy separator.

5. A fuel cell stack according to claim 1, wherein at least at one end of said stack body in the stacking direction, a first dummy cell is provided, a second dummy cell is provided outside said first dummy cell, an end separator is provided outside said second dummy cell, said terminal plate is provided outside said end separator, said insulating plate is provided outside said terminal plate, and said end plate is provided outside said insulating plate.

6. A fuel cell stack according to claim 1, wherein said separator and said dummy separator comprise first and second metal separators; a first insulating member is formed on both surfaces of said first metal separator, said first insulating member including a ridge seal; a second insulating member is formed on both surfaces of said second metal separator, said second insulating member only including a planar seal; and an end separator having the same structure as said second metal separator is provided between said dummy cell and said terminal plate, and said end separator includes a ridge seal at a position overlapping said ridge seal of said first metal separator of said dummy cell, said ridge seal protruding toward said terminal plate.

7. A fuel cell stack according to claim 1, wherein said separator and said dummy separator comprise first and second metal separators; a first insulating member is formed on both surfaces of said first metal separator, said first insulating member including a ridge seal; a second insulating member is formed on both surfaces of said second metal separator, said second insulating member only including a planar seal; and an end separator having the same structure as said second metal separator is provided between said dummy cell and said insulating plate, and said end separator includes a ridge seal at a position overlapping said ridge seal of said first metal separator of said dummy cell, said ridge seal protruding toward said insulating plate.

\* \* \* \* \*